US011199431B2

(12) United States Patent
Patten

(10) Patent No.: US 11,199,431 B2
(45) Date of Patent: Dec. 14, 2021

(54) FLOWMETER CALIBRATION METHOD AND RELATED APPARATUS

(71) Applicant: Micro Motion, Inc., Boulder, CO (US)

(72) Inventor: Andrew Timothy Patten, Boulder, CO (US)

(73) Assignee: Micro Motion, Inc., Boulder, CO (US)

( * ) Notice: Subject to any disclaimer, the term of this patent is extended or adjusted under 35 U.S.C. 154(b) by 140 days.

(21) Appl. No.: 16/336,714

(22) PCT Filed: Oct. 4, 2016

(86) PCT No.: PCT/US2016/055340
§ 371 (c)(1),
(2) Date: Mar. 26, 2019

(87) PCT Pub. No.: WO2018/067128
PCT Pub. Date: Apr. 12, 2018

(65) Prior Publication Data
US 2019/0234784 A1 Aug. 1, 2019

(51) Int. Cl.
G01F 1/84 (2006.01)
G01F 25/00 (2006.01)
G01F 15/02 (2006.01)

(52) U.S. Cl.
CPC .......... G01F 1/8436 (2013.01); G01F 1/8431 (2013.01); G01F 15/02 (2013.01); G01F 25/0007 (2013.01)

(58) Field of Classification Search
None
See application file for complete search history.

(56) References Cited

U.S. PATENT DOCUMENTS

| 7,194,368 B2 * | 3/2007 | Stack | G01F 1/8413 702/100 |
| 2004/0030522 A1 | 2/2004 | Tison et al. | |
| 2006/0235629 A1 | 10/2006 | Walker et al. | |
| 2012/0125124 A1 | 5/2012 | Hays et al. | |
| 2014/0137626 A1 * | 5/2014 | Patten | G01F 1/8472 73/1.16 |

FOREIGN PATENT DOCUMENTS

| WO | 2004106868 A1 | 12/2004 | |
| WO | 2013002759 A1 | 1/2013 | |
| WO | WO-2016064488 A1 * | 4/2016 | ........... G01F 1/8436 |

* cited by examiner

Primary Examiner — Roy Y Yi
(74) Attorney, Agent, or Firm — The Ollila Law Group LLC

(57) ABSTRACT

A method of automatically verifying accurate operation of a flowmeter during field operation is provided that comprises providing a flowmeter having meter electronics with a storage system, and flowing a non-calibration process fluid through the flowmeter. Meter electronics are configured to perform the steps of: detecting a model of the flowmeter as well as retrieving an initial factory calibration factory zero value and a stored zero drift specification from the storage system. A zero value is measured during field operation of the flowmeter and compared with the factory zero value. An error zero value is calculated. Whether the error between the field operation zero value and the factory zero value is within the zero drift specification is determined, and the flowmeter is calibrated if the error is outside the zero drift specification.

19 Claims, 3 Drawing Sheets

FLOWMETER CALIBRATION METHOD AND RELATED APPARATUS

TECHNICAL FIELD

The present application is related to the field of flowmeters, and more particularly to flowmeter calibration and performance verification.

BACKGROUND OF THE INVENTION

Vibrating sensors, such as for example, vibrating densitometers and Coriolis flowmeters are generally known, and are used to measure mass flow and other information for materials flowing through a conduit within the flowmeter. Exemplary Coriolis flowmeters are disclosed in U.S. Pat. Nos. 4,109,524, 4,491,025, and Re. 31,450, all to J. E. Smith et al. These flowmeters have one or more conduits of a straight or curved configuration. Each conduit configuration in a Coriolis mass flowmeter, for example, has a set of natural vibration modes, which may be of simple bending, torsional, or coupled type. Each conduit can be driven to oscillate at a preferred mode.

Material flows into the flowmeter from a connected pipeline on the inlet side of the flowmeter, is directed through the conduit(s), and exits the flowmeter through the outlet side of the flowmeter. The natural vibration modes of the vibrating system are defined in part by the combined mass of the conduits and the material flowing within the conduits.

When there is no flow through the flowmeter, a driving force applied to the conduit(s) causes all points along the conduit(s) to oscillate with identical phase or a small "zero offset", which is a time delay measured at zero flow. As material begins to flow through the flowmeter, Coriolis forces cause each point along the conduit(s) to have a different phase. For example, the phase at the inlet end of the flowmeter lags the phase at the centralized driver position, while the phase at the outlet end leads the phase at the centralized driver position. Pickoffs on the conduit(s) produce sinusoidal signals representative of the motion of the conduit(s). Signals output from the pickoffs are processed to determine the time delay between the pickoffs. The time delay between the two or more pickoffs is proportional to the mass flow rate of material flowing through the conduit(s).

Meter electronics connected to the driver generate a drive signal to operate the driver and determine a mass flow rate and other properties of a material from signals received from pickoff sensors. The driver may comprise one of many well-known arrangements; however, a magnet and an opposing drive coil have received great success in the flowmeter industry. An alternating current is passed to the drive coil for vibrating the conduit(s) at a desired flow tube amplitude and frequency. It is also known in the art to provide the pickoffs as a magnet and coil arrangement very similar to the driver arrangement. However, while the driver receives a current which induces a motion, the pickoffs can use the motion provided by the driver to induce a voltage. The magnitude of the time delay measured by the pickoffs is very small; often measured in nanoseconds. Therefore, it is necessary to have the transducer output be very accurate.

Generally, a Coriolis flowmeter can be initially calibrated and a flow calibration factor along with a zero offset can be generated. In use, the flow calibration factor can be multiplied by the time delay measured by the pickoffs minus the zero offset to generate a mass flow rate. In most situations, the flowmeter is initially calibrated, typically by the manufacturer, and assumed to provide accurate measurements without subsequent calibrations required. However, besides factory preset data, the flowmeter installation process involves several configuration checks that should be performed to optimize performance. Unfortunately, end users and field service technicians may not always completely check the installation. This generally arises out of a perceived setup difficulty, in addition to the inherent complexity of underlying flowmeter operation principles. Factors that may cause difficulty with flowmeter operation include flow rates, temperature, and pressure, as such parameters are generally only estimates at the beginning of an installation cycle. Even if these estimates are relatively accurate, the correct information is often unavailable to the user at the time of meter installation. The user generally requires guidance at this point of use to properly check and calibrate the meter.

Certain checks may be effectuated at installation. These include, but are not limited to: activating pressure correction, validating meter factors, and zeroing the mass flow measurement at operating temperature. What is needed in the art is a method of performing these checks easily and accurately with minimal training of field service technicians. The present invention overcomes this issue and other problems and an advance in the art is achieved.

SUMMARY OF THE INVENTION

A method of automatically verifying accurate operation of a flowmeter during field operation is provided. The method comprises providing a flowmeter having a meter electronics that comprises a storage system. A non-calibration process fluid is flowed through the flowmeter. The meter electronics are configured to perform the steps of detecting a model of the flowmeter and retrieving a factory zero value from the storage system, wherein the factory zero value was determined during an initial factory calibration. The meter electronics are further configured to retrieve a stored zero drift specification from the storage system based on the model of flowmeter detected and to measure a zero value during field operation of the flowmeter. The field operation zero value is compared with the factory zero value, and an error between the field operation zero value and the factory zero value is calculated. Whether the error between the field operation zero value and the factory zero value is within the zero drift specification is determined, and the flowmeter is calibrated if the error is outside the zero drift specification.

A method of automatically verifying accurate operation of a flowmeter during field operation is provided. The method comprises providing a flowmeter having a meter electronics that comprises a storage system. A non-calibration process fluid is flowed through the flowmeter. The meter electronics are configured to perform the steps of detecting a model of the flowmeter and retrieving a stored gas specification from the storage system based on the model of flowmeter detected. The meter electronics are further configured to receive a pressure value during field operation of the flowmeter and to compare the received pressure value with the stored gas specification. Whether the difference between received pressure value and the stored gas specification is outside a predetermined threshold is determined. A pressure compensation is activated if the difference between received pressure value and the stored gas specification is outside the predetermined threshold, and deactivated if the difference between received pressure value and the stored gas specification is within the predetermined threshold.

A flowmeter is provided. The flowmeter comprises a sensor assembly comprising at least one conduit vibratable by a driver, pickoff sensors operable to detect vibrations of the at least one conduit, and meter electronics comprising a processing system and a storage system. The meter electronics is configured to retrieve at least one stored specification from the storage system and measure at least one operating condition value of the flowmeter. The at least one operating condition value is compared with the at least one stored specification value, and an error between the at least one operating condition value and the at least one stored specification value is calculated.

Aspects of the Invention

According to an aspect, a method of automatically verifying accurate operation of a flowmeter during field operation is provided. The method comprises the steps of: providing a flowmeter having a meter electronics comprising a storage system; and flowing a non-calibration process fluid through the flowmeter; wherein the meter electronics are configured to perform the steps of: detecting a model of the flowmeter; retrieving a factory zero value from the storage system, wherein the factory zero value was determined during an initial factory calibration; retrieving a stored zero drift specification from the storage system based on the model of flowmeter detected; measuring a zero value during field operation of the flowmeter; comparing the field operation zero value with the factory zero value; calculating an error between the field operation zero value and the factory zero value; determining whether the error between the field operation zero value and the factory zero value is within the zero drift specification; and calibrating the flowmeter if the error is outside the zero drift specification.

Preferably, the method further comprises the step of prompting a user to enter at least one operating condition value into meter electronics.

Preferably, at least one operating condition comprises a pressure.

Preferably, the step of calibrating the flowmeter if the error is outside the zero drift specification further comprises the step of prompting a user to calibrate the flowmeter.

Preferably, the method further comprises the step of prompting the user to zero the flowmeter.

Preferably, the step of prompting a user to calibrate the flowmeter comprises prompting the user to activate or deactivate a pressure compensation.

Preferably, the method further comprises the steps of determining whether the factory zero value is being used by the meter electronics; wherein the step of comparing the field operation zero value with the factory zero value comprises comparing the field operation zero value to an updated zero value if the factory zero value is not being used by the meter electronics.

Preferably, the method further comprises the step of meter electronics retrieving a pressure effect specification from the storage system.

Preferably, the method further comprises the step of measuring a density of the non-calibration process fluid.

Preferably, the method further comprises the step of measuring a flow rate of the non-calibration process fluid.

Preferably, the method further comprises the step of measuring a temperature of the non-calibration process fluid.

According to an aspect, a method of automatically verifying accurate operation of a flowmeter during field operation is provided. The method comprises: providing a flowmeter having a meter electronics comprising a storage system; flowing a non-calibration process fluid through the flowmeter; wherein the meter electronics are configured to perform the steps of: detecting a model of the flowmeter; retrieving a stored gas specification from the storage system based on the model of flowmeter detected; receiving a pressure value during field operation of the flowmeter; comparing the received pressure value with the stored gas specification; determining whether the difference between received pressure value and the stored gas specification is outside a predetermined threshold; activating a pressure compensation if the difference between received pressure value and the stored gas specification is outside the predetermined threshold; and deactivating the pressure compensation if the difference between received pressure value and the stored gas specification is within the predetermined threshold.

According to an aspect, a flowmeter comprises: a sensor assembly comprising at least one conduit vibratable by a driver; pickoff sensors operable to detect vibrations of the at least one conduit; and a meter electronics comprising a processing system and a storage system configured to: retrieve at least one stored specification from the storage system; measure at least one operating condition value of the flowmeter; compare the at least one operating condition value with the at least one stored specification value; and calculate an error between the at least one operating condition value and the at least one stored specification value.

Preferably, the meter electronics is configured to prompt a user to calibrate the flowmeter if the error is greater than a predetermined value.

Preferably, the meter electronics is configured to calibrate the flowmeter if the error is greater than a predetermined value.

Preferably, the meter electronics is configured to prompt a user to enter at least one operating condition value into meter electronics.

Preferably, the flowmeter calibration comprises zeroing the flowmeter.

Preferably, the flowmeter calibration comprises activating or deactivating a pressure compensation.

Preferably, the at least one stored specification comprises at least one of a zero drift specification, and a pressure effect specification.

Preferably, the at least one operating condition comprises at least one of a flow rate, a temperature, a pressure, and a density.

DETAILED DESCRIPTION OF THE INVENTION

Figure 1:
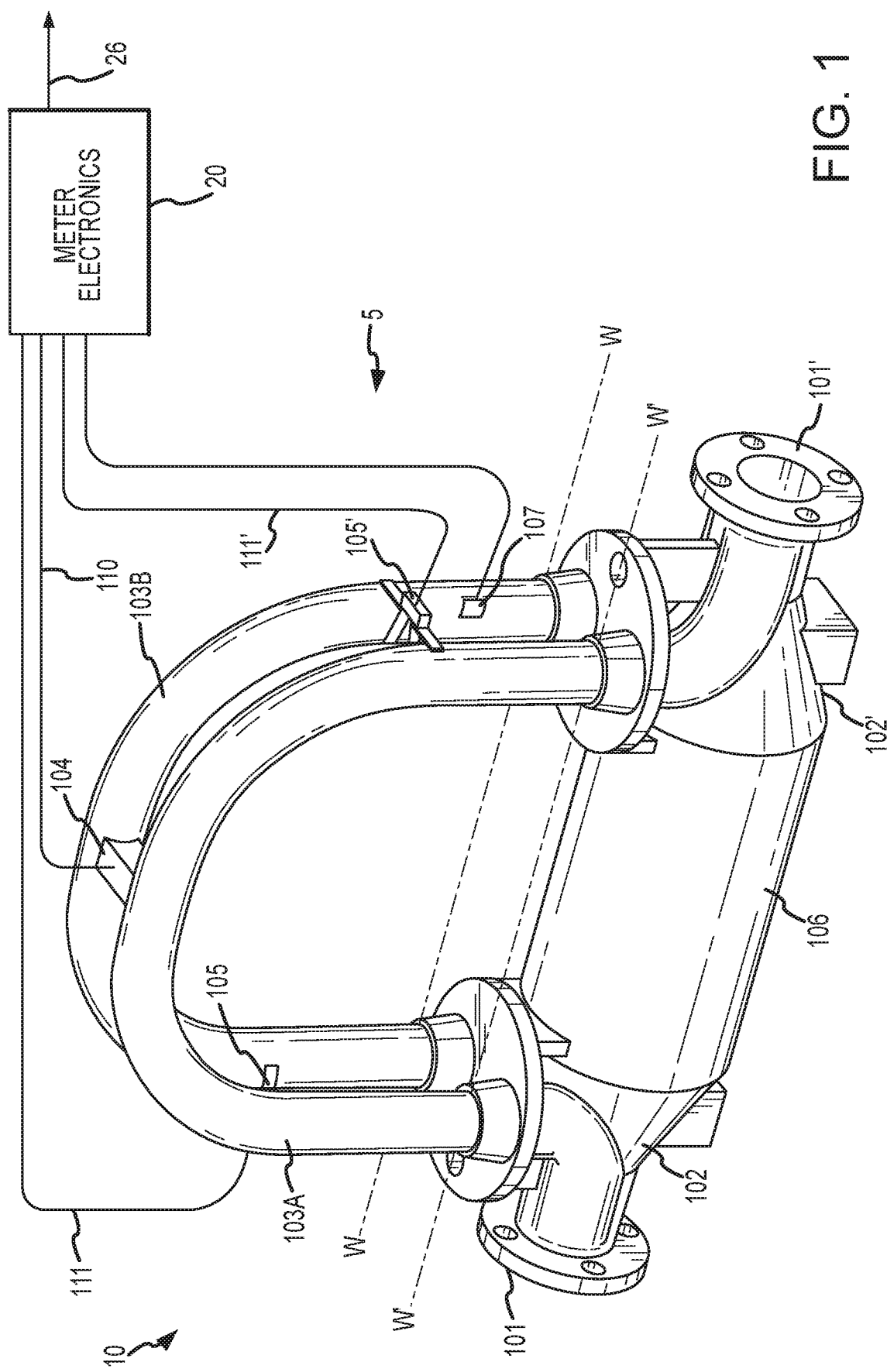
FIG. 1 shows a vibrating sensor assembly according to an embodiment.
Figure 2:
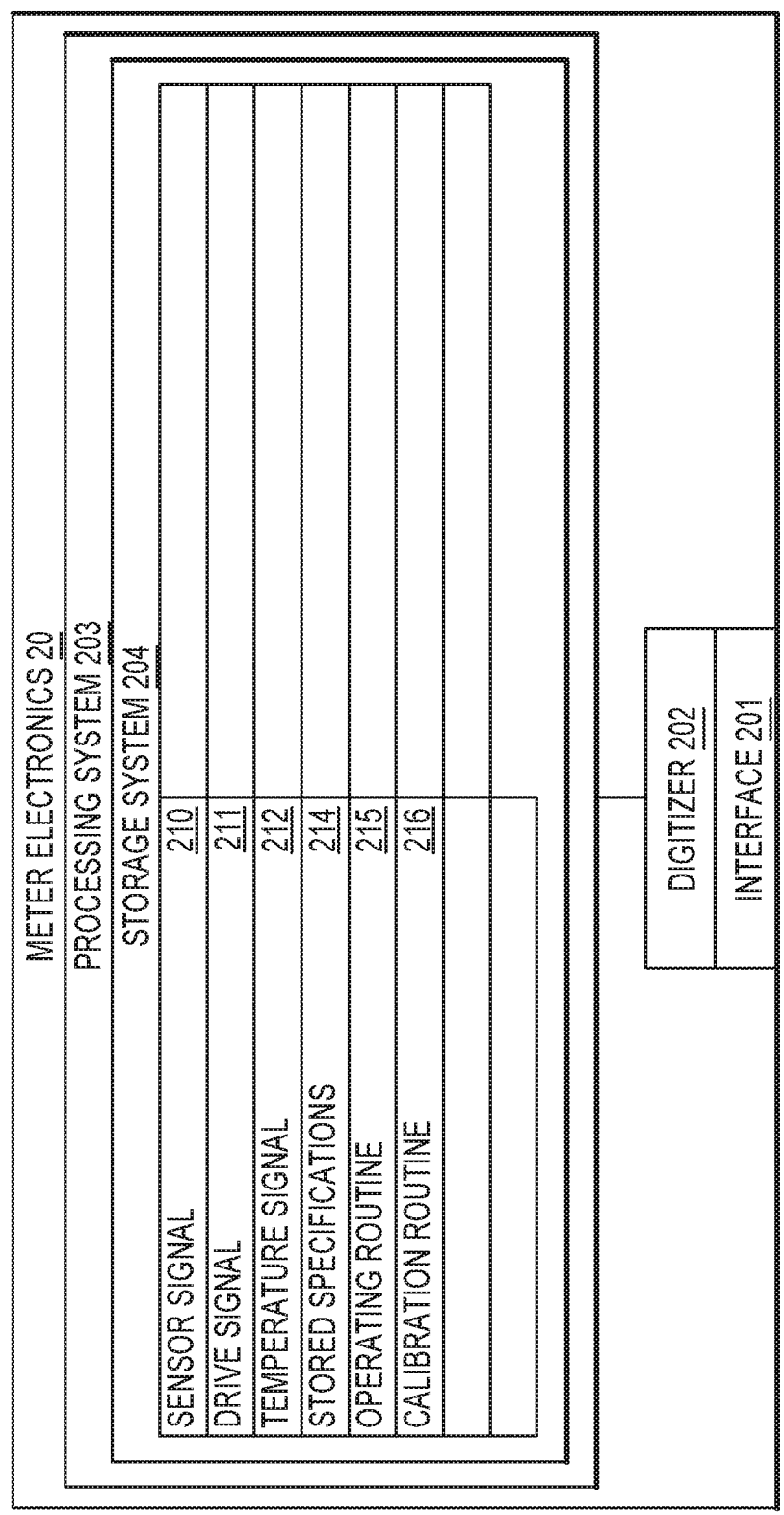
FIG. 2 shows meter electronics according to an embodiment.
Figure 3:
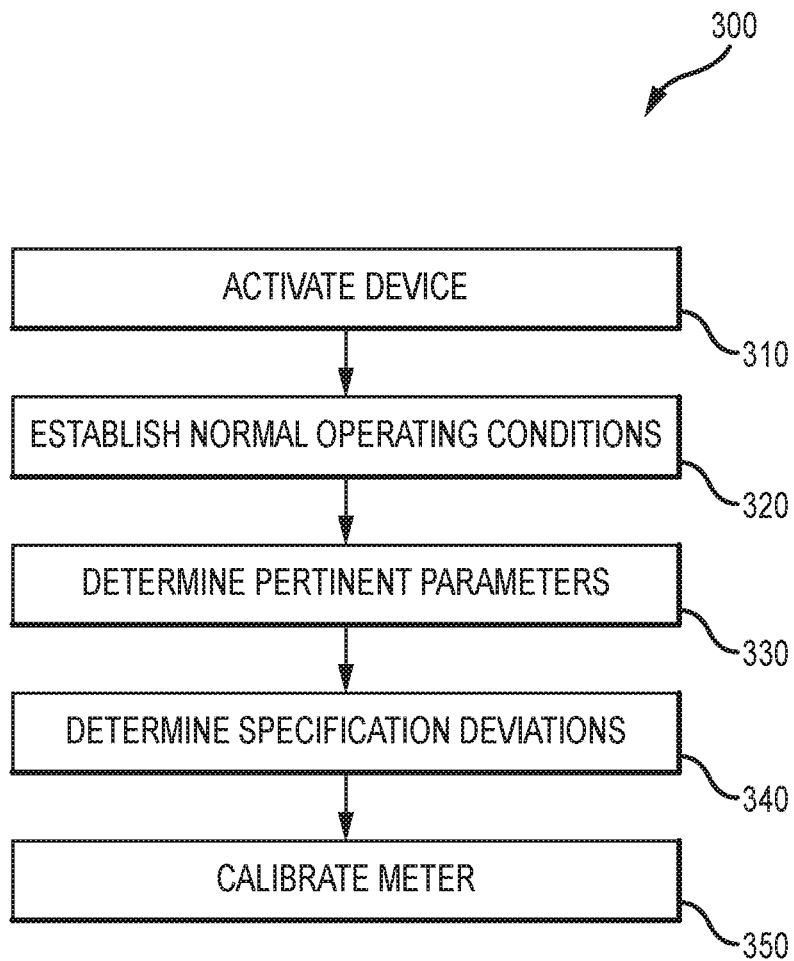
FIG. 3 depicts a flowchart illustrating steps in a method according to an embodiment.

FIGS. 1-3 and the following description depict specific examples to teach those skilled in the art how to make and use the best mode of the Application. For the purpose of teaching inventive principles, some conventional aspects have been simplified or omitted. Those skilled in the art will appreciate variations from these examples that fall within the scope of the Application. Those skilled in the art will appreciate that the features described below can be combined in various ways to form multiple variations of the Application. As a result, the Application is not limited to the specific examples described below, but only by the claims and their equivalents.

FIG. 1 illustrates an example of a flowmeter 5 in the form of a Coriolis flowmeter, comprising a sensor assembly 10 and one or more meter electronics 20. The one or more meter electronics 20 are connected to sensor assembly 10 to measure a characteristic of a flowing material, such as, for example, density, mass flow rate, volume flow rate, totalized mass flow, temperature, and other information. The flowmeter 5 may be a density meter, a Coriolis flow meter, or any other vibratory meter known in the art.

The sensor assembly 10 includes a pair of flanges 101 and 101', manifolds 102 and 102', and conduits 103A and 103B. Manifolds 102, 102' are affixed to opposing ends of the conduits 103A, 103B. Flanges 101 and 101' of the present example are affixed to manifolds 102 and 102'. Manifolds 102 and 102' of the present example are affixed to opposite ends of spacer 106. The spacer 106 maintains the spacing between manifolds 102 and 102' in the present example to prevent undesired vibrations in conduits 103A and 103B. The conduits 103A and 103B extend outwardly from the manifolds in an essentially parallel fashion. When the sensor assembly 10 is inserted into a pipeline system (not shown) which carries the flowing material, the material enters sensor assembly 10 through flange 101, passes through inlet manifold 102 where the total amount of material is directed to enter conduits 103A and 103B, flows through conduits 103A and 103B and back into outlet manifold 102' where it exits the sensor assembly 10 through the flange 101'.

The sensor assembly 10 includes a driver 104. The driver 104 is affixed to conduits 103A and 103B in a position where the driver 104 can vibrate the conduits 103A, 103B in the drive mode. More particularly, the driver 104 includes a first driver component (not shown) affixed to conduit 103A, and a second driver component (not shown) affixed to conduit 103B. The driver 104 may comprise one of many well-known arrangements, such as a magnet mounted to the conduit 103A and an opposing coil mounted to the conduit 103B.

In the present example, the drive mode is the first out of phase bending mode and the conduits 103A and 103B are preferably selected and appropriately mounted to inlet manifold 102 and outlet manifold 102' so as to provide a balanced system having substantially the same mass distribution, moments of inertia, and elastic moduli about bending axes W-W and W'-W', respectively. In the present example, where the drive mode is the first out of phase bending mode, the conduits 103A and 103B are driven by the driver 104 in opposite directions about their respective bending axes W-W and W'-W'. A drive signal in the form of an alternating current can be provided by one or more meter electronics 20, such as for example, via pathway 110, and passed through the coil to cause both conduits 103A, 103B to oscillate. Those of ordinary skill in the art will appreciate that other drive modes may be used within the scope of the present invention.

The sensor assembly 10 shown includes a pair of pickoffs 105, 105' that are affixed to conduits 103A, 103B. More particularly, a first pickoff component (not shown) is located on conduit 103A and a second pickoff component (not shown) is located on conduit 103B. In the embodiment depicted, the pickoffs 105, 105' may be electromagnetic detectors, for example—pickoff magnets and pickoff coils that produce pickoff signals that represent the velocity and position of the conduits 103A, 103B. For example, the pickoffs 105, 105' may supply pickoff signals to the one or more meter electronics 20 via pathways 111, 111'. Those of ordinary skill in the art will appreciate that the motion of the conduits 103A, 103B is proportional to certain characteristics of the flowing material, for example, the mass flow rate and density of the material flowing through the conduits 103A, 103B.

It should be appreciated that while the sensor assembly 10 described above comprises a dual flow conduit flowmeter, it is well within the scope of the present invention to implement a single conduit flowmeter. Furthermore, while the flow conduits 103A, 103B are shown as comprising a curved flow conduit configuration, the present invention may be implemented with a flowmeter comprising a straight flow conduit configuration. Therefore, the particular embodiment of the sensor assembly 10 described above is merely one example and should in no way limit the scope of the present invention.

In the example shown in FIG. 1, the one or more meter electronics 20 receives the pickoff signals from the pickoffs 105, 105'. Path 26 provides an input and an output means that allows one or more meter electronics 20 to interface with an operator. The one or more meter electronics 20 measures a characteristic of a flowing material, such as, for example, a phase difference, a frequency, a time delay, a density, a mass flow rate, a volume flow rate, a totalized mass flow, a temperature, a meter verification, and/or other information. More particularly, the one or more meter electronics 20 receives one or more signals, for example, from pickoffs 105, 105' and one or more temperature sensors 107, such as a resistive temperature device (RTD), and use this information to measure a characteristic of a flowing material.

The techniques by which vibrating sensor assemblies, such as for example, Coriolis flowmeters or densitometers, measure a characteristic of a flowing material are well understood; therefore, a detailed discussion is omitted for brevity of this description.

FIG. 2 shows the meter electronics 20 according to an embodiment of the invention. The meter electronics 20 can include an interface 201 and a processing system 203. The processing system 203 may include a storage system 204. The storage system 204 may comprise an internal memory, or alternatively, may comprise an external memory. The meter electronics 20 can generate a drive signal 211 and supply the drive signal 211 to the driver 104. In addition, the meter electronics 20 can receive sensor signals 210 from the flowmeter 5 such as pickoff/velocity sensor signals, strain signals, optical signals, or any other signals known in the art. In some embodiments, sensor signals 210 can be received from the driver 104. The meter electronics 20 can operate as a densitometer or can operate as a mass flowmeter, including operating as a Coriolis flowmeter. It should be appreciated that the meter electronics 20 may also operate as some other type of vibrating sensor assembly and the particular examples provided should not limit the scope of the present invention. The meter electronics 20 can process the sensor signals 210 in order to obtain flow characteristics of the material flowing through the flow conduits 103A, 103B. In some embodiments, the meter electronics 20 may receive a temperature signal 212 from one or more resistance temperature detector (RTD) sensors or other temperature sensors 107, for example.

The interface 201 can receive the sensor signals 210 from the driver 104 or pickoffs 105, 105', via leads 110, 111, 111'. The interface 201 may perform any necessary or desired signal conditioning, such as any manner of formatting, amplification, buffering, etc. Alternatively, some or all of the signal conditioning can be performed in the processing system 203. In addition, the interface 201 can enable communications between the meter electronics 20 and external devices. The interface 201 can be capable of any manner of electronic, optical, or wireless communication.

The interface 201 in one embodiment can include a digitizer 202, wherein the sensor signal comprises an analog sensor signal. The digitizer 202 can sample and digitize the analog sensor signal and produce a digital sensor signal. The digitizer 202 can also perform any needed decimation, wherein the digital sensor signal is decimated in order to reduce the amount of signal processing needed and to reduce the processing time.

The processing system 203 can conduct operations of the meter electronics 20 and process flow measurements from the sensor assembly 10. The processing system 203 can execute one or more processing routines, such as an operating routine 215, and a calibration routine 216.

According to an embodiment, the meter electronics 20 can be configured to measure flow through the flowmeter 5 as part of the operating routine 215. Density, temperature, and other parameters may also be measured. According to an embodiment, the meter electronics 20 can also measure and store a temperature signal 212, and associate that temperature with the flow rates captured at that temperature.

As an example of a calibration routine 216, the meter electronics 20 may utilize general operating conditions, as will be discussed further below. For example, recent or current operating conditions derived by the flowmeter's 5 sensors may be compared to past operating conditions, and the flowmeter 5 may verify that values have or have not changed. General operating conditions may include the flow rate, temperature, pressure, density, pressure effect, and any other meter-related values that may be derived, measured, and/or input. Once operating, the flowmeter may evaluate the performance associated with various parameters. These may include, inter alia, zero drift vs. temperature, zero stability, zero stability uncertainty, zero drift vs. temperature specification, baseline uncertainty, and any other values known in the art. Based on pre-established guidelines and stored specifications in the storage system 204, the meter may prompt the user to zero the meter and/or activate pressure compensation.

The processing system 203 can comprise a general purpose computer, a micro-processing system, a logic circuit, or some other general purpose or customized processing device. The processing system 203 can be distributed among multiple processing devices. The processing system 203 can include any manner of integral or independent electronic storage medium, such as the storage system 204.

The processing system 203 processes the sensor signal 210 in order to generate the drive signal 211, among other things. The drive signal 211 is supplied to the driver 104 in order to vibrate the associated flow tube(s), such as the flow tubes 103A, 103B of FIG. 1.

It should be understood that the meter electronics 20 may include various other components and functions that are generally known in the art. These additional features are omitted from the description and the figures for the purpose of brevity. Therefore, the present invention should not be limited to the specific embodiments shown and discussed.

FIG. 3 depicts the steps of a method to perform a flowmeter 5 calibration according to an embodiment. First, meter electronics 20 are activated 310. However, in an embodiment, an external computing device may be placed in communication with meter electronics and this device may be activated instead of, or along with, meter electronics 20. Then the user may be prompted to establish normal operating conditions 320. This may be from a presented list of available choices, or the user may enter the conditions manually. In an embodiment, the normal operating conditions are pre-programmed in meter electronics 20 or the external computing device, so the user may not need to be prompted to establish normal operating conditions. In a related embodiment, the normal operating conditions are pre-programmed in meter electronics 20 or the external computing device, and the user is prompted to verify said normal operating conditions. In yet another embodiment, the meter electronics 20 may record a history of operation, thus normal operating conditions may be pre-stored in meter electronics. The pre-stored operating conditions can be an average of condition values over time or may be a single measurement of operating conditions. The values may be raw values or weighted values. The operating conditions may include, without limitation, operating flow rate, operating temperature, operating pressure, operating density, zero temperature, pressure compensation status, zero drift vs. temperature specifications, zero stability specifications, and any other parameter known in the art.

Then, the pertinent parameters related to normal operating conditions are recognized 330 by the system. This may include inputting and recording the parameters and/or reading stored parameters from the storage system 204 and/or the external computing device. The deviation of each parameter from specifications may then be determined 340.

Next, the flowmeter 5 may be calibrated 350. The calibration step 350 may entail prompting a user to zero the flowmeter 5. This may be at operating temperature. In another embodiment, the meter electronics 20 or external computing device may automatically zero the flowmeter 5. A user may be notified if an automatic zeroing is performed. Furthermore, a user may be required to provide an input in response to a prompt for the zeroing to occur. Additionally, pressure compensation may be activated or deactivated as necessitated. Meter factors may also be validated in this step.

Typically, a user is required to input specifications according to a product data sheet. However, according to an embodiment, there is no need to refer to external references, as the meter electronics 20 or external computing device has such parameters stored therein. This speeds up the calibration process, and minimizes/eliminates data-input-related mistakes. Similarly, the meter electronics 20 or external computing device may supply the operating temperature—again speeding up the calibration process and minimizing/eliminating data-input-related mistakes. Furthermore, the flowmeter 5 can measure the operating flow rate, either instantly or over time, and provide an instant, historical, and/or an averaged or weighted value which is more accurate than a user-provided value. In some cases, the flowmeter 5 may not know the operating pressure, and this would be measured and input by the user. However, in an embodiment, the flowmeter 5 may provide a measured operating pressure. In a related embodiment, an external pressure sensor may communicate with the meter electronics 20 or external computing device and provide pressure information. Providing these and/or other parameters, according to an embodiment, the flowmeter 5 may be calibrated as in step 350.

According to an example, a calibration/initial configuration of a flowmeter 5 is illustrated. The values provided are merely for illustrative purposes, and in no way limit the scope of the claims and/or embodiments. For this example, it is assumed that a flowmeter is operating at 30° C. at 30 bar, and that 10,900 kg/h of natural gas is flowing therethrough. A user would typically refer to the technical specifications to obtain the zero drift specification, which for purposes of this example is 0.0005% of max flow per ° C., with the pressure effect being −0.012% per bar. In this situation, the user must decide whether or not the flowmeter needs to be zeroed. In order for the user to make this assessment, the specifications for the flowmeter 5 must be converted to flow units: Therefore:

$$\frac{\% \text{ of max flow per } °C}{100\%} * \text{mass flow rate} = \text{Adjustment Value} \quad (1)$$

$$\text{zero drift} = \text{adjustment value} * (\text{operating temperture} - \text{zero temperature}) \quad (2)$$

$$\text{operating error} = \frac{\text{zero drift}}{\text{operating flow rate}} * 100\% \quad (3)$$

Thus, according to Equation (1), 0.0005/100%*87,200 kg/h=0.24 kg/h per ° C. For this illustration, the flowmeter 5 is zeroed at the factory at 20° C., so according to Equation (2), the zero drift is 0.24 kg/h*(30−20)=2.4 kg/h. The error at operating flow, according to Equation (3) is therefore 2.4/10,900*100%=0.02%. Since 0.02% is less than the zero drift technical specification of 0.35%, the meter would not need to be zeroed in this scenario. It should be noted that the above equations are examples only, and other equations may be employed to reach the same or similar conclusions.

In this same example, the user also may decide whether or not a pressure compensation should be activated. The following equations could, in an embodiment, be utilized:

$$\text{pressure effect} = \text{pressure effect specification} * \text{operating temperature} \quad (4)$$

According to Equation (4), the pressure effect is (−0.012% per bar)*30=−0.36%, which is greater than the pressure effect gas specification of 0.35%. In this example, pressure compensation should be activated. As noted above, the flowmeter 5 may auto-calibrate without any input, or the user may be prompted to calibrate the flowmeter 5.

The analysis illustrated above is not generally well understood by many field service technicians or end users. As a result, meters are often zeroed when they don't need to be which creates unneeded work by the user. Cases where pressure compensation is not turned on when it would be advantageous may result in suboptimal performance.

In the following example, according to an embodiment, a user is not required to make any calculations, nor is the user required to obtain equipment specifications. This drastically reduces the propensity to make errors and also speeds up the process. Again, the values provided are merely for illustrative purposes, and in no way limit the scope of the claims and/or embodiments. In order to determine the calibration status of a newly installed flowmeter 5 for example, the initial state of the flowmeter 5 contains most of the information required to make the calibration decisions internally, according to an embodiment. The flowmeter 5 contains all of the specifications in meter electronics 20 so that the specification data need not need referenced. The flowmeter 5 also has pre-programmed the zero temperature and the operating temperature in order to calculate zero drift. The flowmeter recognizes the operating flow rate so that the expected impact of temperature on measurements is known or calculable. The flowmeter 5 may not, in some embodiments, know the operating pressure, so the user may be prompted to input operating pressure if required. If pressure compensation is activated, then pressure values may already be stored within the flowmeter 5. Once the operating pressure is determined, the impact of pressure may be calculated by the flowmeter 5. In other embodiments, the flowmeter 5 may measure the operating pressure. This may be accomplished with a pressure sensor. The pressure sensor may be a part of the flowmeter 5, or may be external to the flowmeter.

The known meter specifications may be compared to known and/or measured operating conditions. Furthermore, present operating conditions may be compared to past operating conditions, and the flowmeter 5 may verify that values have or have not changed. In an example, without limitation, the operating state of the flowmeter 5 is determined. In operation, the flow rate, temperature, pressure, density, pressure effect, and any other meter-related values may be derived, measured, and/or input. Once operating, the flowmeter may calculate the performance associated with various parameters. These may include, inter alia, zero drift vs. temperature, zero stability, zero stability uncertainty, zero drift vs. temperature specification, baseline uncertainty, and any other values known in the art. Based on pre-established guidelines, the meter may prompt the user to zero the meter and/or activate pressure compensation. Alternatively, the flowmeter 5 may automatically activate/deactivate pressure compensations and/or perform a zeroing.

All embodiments may be performed while the flowmeter 5 is online or off-line. For example, an off-line mode may be employed to input required operating conditions in applications where the user cannot operate the meter at the time the evaluation is being conducted. In embodiments, a user interface may walk a user through the configuration process of zeroing or enabling pressure compensation in a step-by-step basis. The interface may comprise text, graphics, sound, etc. In addition to the mass flow analyses presented here, the similar analyses may be performed for density and/or volumetric flow.

The detailed descriptions of the above embodiments are not exhaustive descriptions of all embodiments contemplated by the inventors to be within the scope of the Application. Indeed, persons skilled in the art will recognize that certain elements of the above-described embodiments may variously be combined or eliminated to create further embodiments, and such further embodiments fall within the scope and teachings of the Application. It will also be apparent to those of ordinary skill in the art that the above-described embodiments may be combined in whole or in part to create additional embodiments within the scope and teachings of the Application.

What is claimed is:

1. A method of automatically verifying accurate operation of a flowmeter during field operation comprising:
providing a flowmeter having a meter electronics comprising a storage system;
flowing a non-calibration process fluid through the flowmeter;
wherein the meter electronics are configured to perform the steps of:
detecting a model of the flowmeter;
retrieving a factory zero value from the storage system, wherein the factory zero value was determined during an initial factory calibration;
retrieving a stored zero drift specification from the storage system based on the model of flowmeter detected;

measuring a zero value during field operation of the flowmeter;

comparing the field operation zero value with the factory zero value;

calculating an error between the field operation zero value and the factory zero value;

determining whether the error between the field operation zero value and the factory zero value is within the zero drift specification;

retrieving a pressure effect specification from the storage system;

calculating a pressure effect using the pressure effect specification; and calibrating the flowmeter if the error is outside the zero drift specification.

2. The method of claim 1, further comprising the step of prompting a user to enter at least one operating condition value into meter electronics.

3. The method of claim 2, wherein the at least one operating condition comprises a pressure.

4. The method of claim 1, wherein the step of calibrating the flowmeter if the error is outside the zero drift specification further comprises the step of prompting a user to calibrate the flowmeter.

5. The method of claim 4, further comprising the step of prompting the user to zero the flowmeter.

6. The method of claim 4, wherein the step of prompting a user to calibrate the flowmeter comprises prompting the user to activate or deactivate a pressure compensation.

7. The method of claim 1, comprising the steps of:
determining whether the factory zero value is being used by the meter electronics;
wherein the step of comparing the field operation zero value with the factory zero value comprises comparing the field operation zero value to an updated zero value if the factory zero value is not being used by the meter electronics.

8. The method of claim 1, further comprising the step of measuring a density of the non-calibration process fluid.

9. The method of claim 1, further comprising the step of measuring a flow rate of the non-calibration process fluid.

10. The method of claim 1, further comprising the step of measuring a temperature of the non-calibration process fluid.

11. A method of automatically verifying accurate operation of a flowmeter during field operation comprising:
providing a flowmeter having a meter electronics comprising a storage system;
flowing a non-calibration process fluid through the flowmeter;
wherein the meter electronics are configured to perform the steps of:
detecting a model of the flowmeter;
retrieving a stored gas specification from the storage system based on the model of flowmeter detected;
receiving a pressure value during field operation of the flowmeter;
retrieving a pressure effect specification from the storage system;
calculate a pressure effect using the pressure effect specification;
comparing the received pressure value with the stored gas specification;
determining whether the difference between received pressure value and the stored gas specification is outside a predetermined threshold;
activating a pressure compensation if the difference between received pressure value and the stored gas specification is outside the predetermined threshold; and
deactivating the pressure compensation if the difference between received pressure value and the stored gas specification is within the predetermined threshold.

12. A flowmeter (5) comprising:
a sensor assembly (10) comprising at least one conduit (103A, 103B) vibratable by a driver (104);
pickoff sensors (105, 105') operable to detect vibrations of the at least one conduit (103A, 103B); and
a meter electronics (20) comprising a processing system (203) and a storage system (204) configured to:
retrieve at least one stored specification from the storage system (204);
retrieve a pressure effect specification from the storage system;
calculate a pressure effect using the pressure effect specification;
measure at least one operating condition value of the flowmeter (5);
compare the at least one operating condition value with the at least one stored specification value (214); and
calculate an error between the at least one operating condition value and the at least one stored specification value (214).

13. The flowmeter (5) of claim 12, wherein the meter electronics (20) is configured to prompt a user to calibrate the flowmeter if the error is greater than a predetermined value.

14. The flowmeter (5) of claim 12, wherein the meter electronics (20) is configured to calibrate the flowmeter (5) if the error is greater than a predetermined value.

15. The flowmeter (5) of claim 12, wherein the meter electronics (20) is configured to prompt a user to enter at least one operating condition value into meter electronics.

16. The flowmeter (5) of claim 14, wherein flowmeter calibration comprises zeroing the flowmeter.

17. The flowmeter (5) of claim 14, wherein flowmeter calibration comprises activating or deactivating a pressure compensation.

18. The flowmeter (5) of claim 12, wherein the at least one stored specification comprises a zero drift specification.

19. The flowmeter (5) of claim 12, wherein the at least one operating condition comprises at least one of a flow rate, a temperature, a pressure, and a density.

* * * * *